United States Patent Office 3,526,954
Patented Sept. 8, 1970

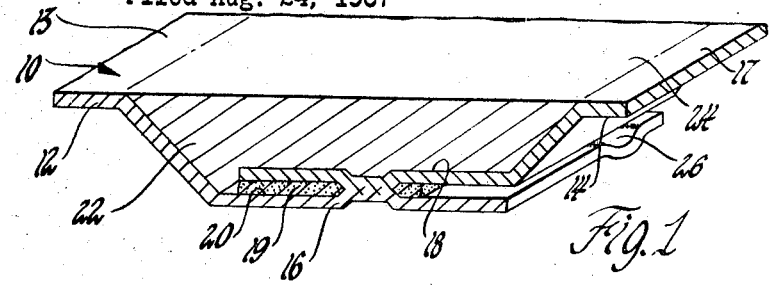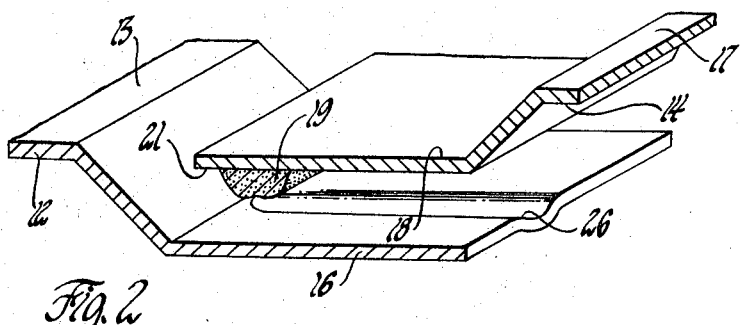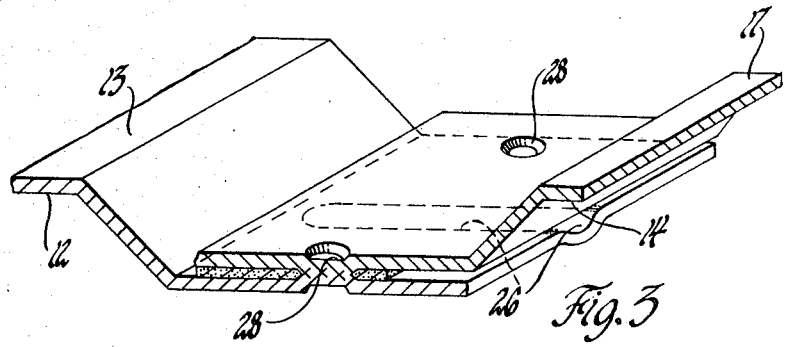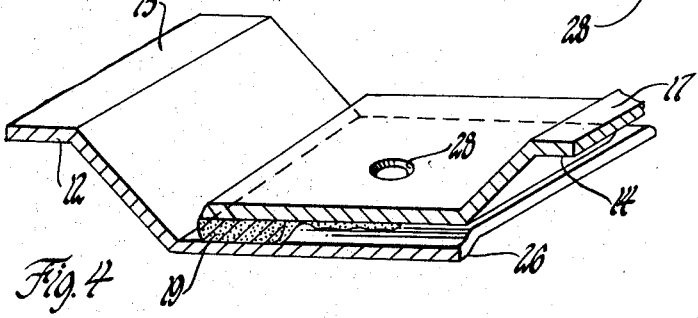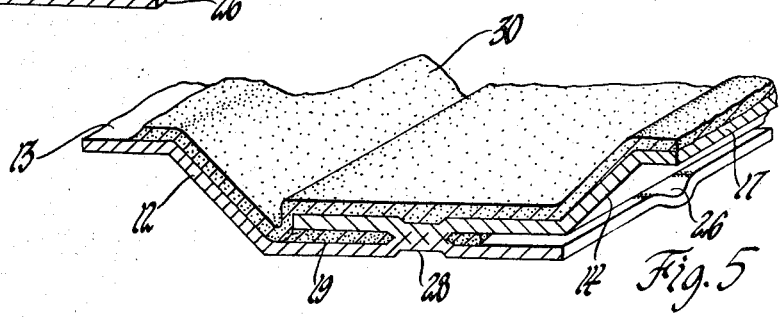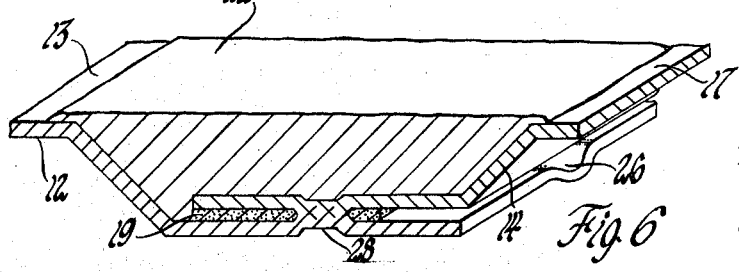
INVENTORS
Seymour Katz, &
Richard M. Baehr
BY
Peter P. Kozak
ATTORNEY

3,526,954
METHOD OF SOLDERING UTILIZING A BACKING COMPOSITION
Seymour Katz, Royal Oak, and Richard M. Baehr, Warren, Mich., assignors to General Motors Corporation, Detroit, Mich., a corporation of Delaware
Filed Aug. 24, 1967, Ser. No. 663,002
Int. Cl. B23k 31/02
U.S. Cl. 29—471.5
3 Claims

ABSTRACT OF THE DISCLOSURE

A backing composition and a method of bridging the gap between overlapping metal parts which are subsequently spot welded together to provide a leakproof seal suitable for retaining molten solder in a subsequent soldering operation are disclosed. The composition contains calcium sulphate dihydrate, powdered graphite, and a suspension agent. Sufficient water is added to the composition to form a soft extrudable paste. The paste is applied to one of the mating surfaces of the overlapping metal parts. The overlapping metal parts are brought in firm or tight contact with each other thereby squeezing the paste and causing it to seal the gap between the overlapping metal parts. The overlapping metal parts are then spot welded. The paste in the gap is dried. The joint formed by the overlapping metal parts including the paste filled gap is heated and covered with molten solder by a soldering operation.

---

This invention relates to soldering, and more particularly to a backing composition for sealing gaps between overlapping metal parts which are subsequently spot welded and exposed to molten solder, and a method for doing the same.

In the manufacture of automobile bodies and the like, it is a common practice to join sheets of metal together with overlapping joints. These overlapping joints are frequently made by spot welding techniques for reasons of cost and manufacturing convenience. The resultant spot welded overlapping joint is usually covered with a lead base solder alloy or the like to bring the level of the joint surface to that of the adjoining surfaces. The excess solder alloy is removed by grinding to give a more eye-appealing surface appearance as well as a seam-free surface.

Presently, body solder is applied in a semifluid or slushy state by hand to cover the spot welded joints. Since the solder is in a slushy or semifluid state, it will not flow through the gaps existing between the overlapping sheets of metal and between the spot welds. This manual or hand operation is slow and costly and varies with the skill of the individual. Attempts to replace this manual operation by a process in which solder is cast over the joint on a production line basis have not been successful due to the tendency of the molten or fluid solder, which is necessary for casting, to leak through the aforementioned gaps existing between the overlapping metal sheets. Leakage of the molten solder through the gaps between the overlapping metal sheets results in a faulty surface which does not have a sufficient quality of solder thereon. In addition, the solder frequently leaks through gaps at locations where the molten solder cannot be recovered. In such a method solder deficient regions result and an additional hand soldering operation with semifluid or slushy solder is required to fill the faulty seam surface thereby increasing the total cost of the soldering operation.

Attempts to fill the gap prior to the spot welding step with a backing composition so that the solder will not leak through the gap have not been successful prior to this invention. In order for a backing composition to function properly, that is to prevent the molten solder from leaking through the gap, it must meet certain requirements. One requirement is that the backing composition be electrically conducting so that it will not interfere with the subsequent spot welding step. Another requirement is that it must not interfere with any subsequent brazing or soldering operation. The backing composition must not evolve gas on heating, such as that encountered in a spot welding operation, that would be obnoxious or cause porosity in the solder. In addition, the dry backing composition must possess the ability to stay in the gap when subjected to vibrations. The backing composition must also be inexpensive and it must not promote corrosion of the soldered joint.

It is a primary object of this invention to provide a backing composition adapted to seal a gap between overlapping metal parts which are subsequently spot welded together so that the molten solder will not pass through the gap. It is another object of this invention to provide a backing composition having the required characteristics referred to above. It is yet another object of this invention to provide a backing composition which can be applied to the surface of an overlapping metal part which is to be spot welded prior to the spot welding step and prior to the application of the molten solder. It is still another object of this invention to provide a method for sealing a gap between overlapping metal parts which are subsequently spot welded together prior to the spot welding operation and the soldering operation.

These and other objects are accomplished by applying a strip or bead of a backing composition paste containing calcium sulphate dihydrate, powered graphite, a suspension agent and water to one of the mating surfaces of the overlapping metal parts. The overlapping metal parts are then brought together in firm or tight contact with each other, thereby squeezing the backing composition paste and causing the backing composition to seal the gaps between the overlapping metal parts. The overlapping metal parts, which are sealed by the backing composition paste, are then spot welded togeher. The paste in the gap is dried. Then the spot welded joint including the paste filled gap is heated and covered with molten solder by a casting operation. The backing composition continues to seal the gap during the casting operation and prevents the molten solder from passing therethrough. Upon cooling, the excess solder is ground off to provide a smooth, seam-free surface.

Other objects and advantages of this invention will be more apparent from the following detailed description, reference being made to the accompanying drawings wherein the preferred embodiment of the invention is shown.

In the drawings:

FIG. 1 is a view partly in cross section of an overlapped joint formed in accordance with this invention;

FIG. 2 is an exploded perspective of the two metal parts to be joined;

FIG. 3 is a view partly in cross section of the parts in FIG. 2 spot welded;

FIG. 4 is a view similar to FIG. 3 but taken in the plane of the imperfection;

FIG. 5 is a view partly in cross section of the parts prior to soldering; and

FIG. 6 is a view partly in cross section of the soldered parts to the final grinding.

Referring now to FIG. 1, a soldered overlapped joint 10 in accordance with this invention consists of metal sheets 12 and 14 having overlapping portions 16 and 18 respectively. The overlapping sheet portions 16 and 18 are held together by spot welds 28. A backing composition 19 fills the gap 20 between the overlapping sheet portions 16 and 18. The backing composition 19 contains 43 to 85 parts by weight calcium sulphate dihydrate, 15 to 55 parts by weight graphite powder, 0.5 to 10 parts by weight suspension agent, 0 to 0.05 part by weight fungicide and 0 to 5 parts by weight short inorganic fibers. This backing composition effectively seals the gaps between the overlapping metal portions thereby preventing molten solder from leaking through the gaps during the soldering step. The backing composition is inexpensive, electrically conducting, and does not promote corrosion of the solder joint. The backing composition does not interfere with any subsequent brazing, welding, or soldering operation and does not evolve any gas on heating that would be obnoxious or that would cause porosity in the solder. The overlapping portions 16 and 18 are covered with a mass of solder 22. The surface 24 of the solder mass 22 is level with adjoining metal sheet surfaces 13 and 17 thereby forming a continuous seam-free surface.

Calcium sulphate dihydrate is the major constituent in the backing composition. Calcium sulphate dihydrate is inexpensive, and, as a result, it is preferable to use as high a concentration as possible. The calcium sulphate dihydrate has a coefficient of expansion, $13 \times 10^{-6}$ in./in./°F., which is higher than the coefficient of expansion of the metal parts, 5 to $7 \times 10^{-6}$ in./in./°F. The relatively high coefficient of the thermal expansion and calcium sulphate dihydrate is essential for the backing composition to maintain a seal at elevated temperatures even though the seal is formed at room temperature. The relatively high coefficient of thermal expansion of calcium sulphate dihydrate causes the backing composition to expand at a somewhat greater rate than the metal as the temperature rises thereby maintaining a positive sealing pressure against the mating surfaces of the overlapping metal sheets at elevated temperatures. The ability of the backing composition to maintain a positive sealing pressure at elevated temperatures such as those encountered with molten solder is of considerable importance in solder casting since this prevents the hot molten solder from leaking through the seam while the solder is in a fluid or molten state. The backing composition contains 43 to 85 parts by weight calcium sulphate dihydrate with the preferred concentration of the calcium sulphate dihydrate being 65 to 70 parts by weight.

The powdered graphite or similar material, such as carbon black, provides the electrical conductivity which is necessary for the subsequent spot welding operation. The backing composition must contain at least 15 parts by weight powered graphite or carbon black. Backing compositions containing less than 15 parts have a high resistance which causes the composition to heat excessively during the spot welding step. The excessive heating in such a case causes the water in the backing composition paste to boil and blow the backing composition away from the spot weld thereby causing an imperfect seal through which the molten solder could leak. The backing composition contains 15 to 55 parts by weight graphite powder with the preferred concentration being 28 to 32 parts by weight powdered graphite.

A suspension agent is desired to keep the powdered graphite and calcium sulphate dihydrate suspended uniformly in the paste. The concentration of the suspension agent is from 0.5 to 10 parts by weight with the preferred concentration being 1 to 2 parts by weight Kelzan. Concentrations greater than 2 parts by weight Kelzan have little appreciable increase in beneficial effect. Kelzan, a highly molecular weight polysaccharide gum material, is a preferred suspension agent. Other organic suspension agents such as animal glue, may be used as well as inorganic suspension agents such as colloidal silica, clay, montmorillonite, and the like.

When an organic suspension agent is used, it is desirable to use a fungicide in order to extend the shelf-life of the suspension agent and backing composition. An example of a fungicide which is satisfactory in the practice of this invention is sodium pentachlorophenol. Other suitable water soluble fungicides such as sodium hypochloride, sodium-ortho-phenylphenate, formalin, sodium o-phenylphenol and sodium 2,4,5-trichlorophenol may be used. The concentration of the fungicide is 0.0 to 0.05 part by weight with the preferred concentration being 0.02 to 0.04 part by weight.

The short inorganic fibers may be chopped glass fibers, asbestos fibers, rock wool, mineral wool, alumina silica fibers or other fibrous ceramic materials. It is desirable to incorporate short inorganic fibers into the backing composition for increased strength when the joint is subjected to vibrations prior to the soldering step. Chopped glass fibers are the preferred strengthening material. The length of the chopped glass fibers is from about ⅛ of an inch to ¾ of an inch with the preferred length being ¼ of an inch. The concentration of the short inorganic fibers is 0 to 5 parts by weight with the preferred concentration of the chopped glass fibers being 1.5 parts by weight. Backing compositions containing more than 5 parts by weight chopped glass fibers are difficult to apply with conventional equipment.

Sufficient water is added to the back composition to form a soft, extrudable paste so that this paste can be readily applied to the overlapping metal sheets. The amount of water that is added may vary depending upon the consistency desired by the individual operator; however, 38 parts by water to 100 parts composition is a satisfactory ratio for the practice of this invention.

The invention will now be described in terms of a method for sealing a gap between overlapping metal parts. As shown in FIG. 2, a strip or bead 19 of the backing composition is applied by hand or with a conventional caulking gun to the mating surface 21 of overlapping sheet portion 18. Overlapping sheet portions 16 and 18 are pressed tightly together thereby squeezing the backing composition strip 19 and causing it to fill all of the voids or spaces between the overlapping plates 16 and 18 including the larger spaces created by depressions 26 which represents imperfections in the sheet metal. The overlapping plate portions 16 and 18 are spot welded together at 28 as shown in FIG. 3. FIG. 3 is a partial cross sectional view of the overlapped joints through a spot welded joint 28. At this point, the backing composition 19 is a very thin sheet or layer. FIG. 4 is a partial cross sectional view of the overlapped joints taken along the line of a depression 26 representing a major imperfection. The backing composition 19 is relatively thick in this region in order to fill the relatively large gap caused by the depression 26.

The overlapped joint is prepared for the subsequent solder casting step by applying a tinning layer 30 as shown in FIG. 5 on the portions of the metal sheet 12 and 14 in the vicinity of the overlapped joints which have a surface lower than the surface 13 and 17 of the metal sheets 12 and 14 respectively. A portion of the surface 13 and 17 are also covered with the tinning layer 30. A typical tinning compound suitable for the practice of this invention contains 30 parts by weight tin powder, 70 parts by weight lead powder, and a proprietary quantity of zinc chloride in water thereby forming a slurry. The tinning compound slurry is applied by means of a paint brush or the like. After the tinning layer 30 is applied, the layer 30 is heated gently by means of a blow torch to vaporize the water in the layer 30 and to melt the metal in the tinning compound. This heating step also removes the water from the backing composition paste.

In some applications it is desirable to weld onto the overlapping metal portion or joint region another metal fixture prior to the tinning step. In this type of application, it is necessary to heat the overlapping metal portions with a blow torch or the like to remove the water from the backing composition paste before the metal fixture is welded to the joint region. An example of this type of application is when parts are MIG (metal-inert gas) welded to the spot weld joint region. After the part is MIG welded on the joint region, the area is tinned as described earlier.

A silicone rubber half-mold is placed over tinned surface. The joint region and half-mold are heated and molten solder at a temperature in the range of 850° F. is poured into the mold and allowed to solidify to form the joint as shown in FIG. 6. A conventional solder containing 91.5 weight percent lead, 5 weight percent antimony, 3 weight percent tin and 0.5 weight percent arsenic is satisfactory. Other solder compositions may be used. The excess solder 22 is then ground until the soldered joint 10 having a smooth surface consisting of parts 13, 24 and 17, as shown in FIG. 1, is obtained.

The following examples show specific backing compositions in accordance with this invention.

EXAMPLE NO. 1

A mixture containing 67.5 parts by weight calcium sulphate dihydrate, 30 parts by weight powdered graphite, 1.5 parts by weight chopped glass fibers, 1.0 part by weight Kelzan and 0.03 part by weight sodium pentachlorophenol was mixed with 38 parts by weight water to form a soft, extrudable paste. The backing composition paste was applied to one of the mating surfaces of the overlapping metal parts which were subsequently brought together tightly thereby squeezing the paste and causing it to fill the voids or spaces between the overlapping metal parts thereby sealing the gap between the metal parts. The metal parts were spot welded together. A tinning slurry was brushed onto the seam area and gently heated with a blow torch. A silicone half-mold was placed over the seam area. The joint mold and the half-mold are heated and molten solder introduced into the mold. The backing composition prevented the molten solder from leaking through the gaps. Upon cooling, the silicone mold was removed leaving a soldered joint having a excess of solder thereon. The excess solder was then removed by grinding to form a smooth surface having a contour which matched the adjoining metal sheet surfaces.

The following table lists Examples 2, 3 and 4 which are different backing compositions as taught by this invention.

BACKING COMPOSITION, PARTS BY WEIGHT

| Example | CaSO$_4$·2H$_2$O | Graphite | Water | Kelzan |
|---|---|---|---|---|
| 2 | 85 | 15 | 50 | 1 |
| 3 | 69 | 30 | 50 | 1 |
| 4 | 50 | 50 | 50 | 1 |

The present invention provides an inexpensive backing composition which permits molten solder to be cast at an elevated temperature in a soldering operation on an overlapped spot welded joint by preventing the solder from passing through the gap between the overlapping metal sheets and without deleteriously affecting the solder.

While the invention has been described in terms of specific examples, it is to be understood that the scope of the invention is not limited thereby except as defined in the following claims.

What is claimed is:
1. A method of joining sheet metal parts comprising the steps of:
   providing metal sheet parts to be joined having edge portions offset from the plane of the sheets adapted to be joined in overlapping relation,
   applying a sealing paste to at least one mating surface of said one offset edge portions, said sealing paste consisting essentially of 43 to 85 parts by weight calcium sulfate dihydrate, 15 to 50 parts by weight powdered graphite, 0.5 to 10 parts by weight suspension agent, 0 to 5 parts by weight chopped inorganic fibers, 0 to 0.05 part by weight fungicide and sufficient water to form a soft, extrudable paste,
   bringing the mating surfaces of said offset edge portions into overlapping relation thereby forcing said composition to seal the gap formed between said offset portions, said edge portions forming a depression in the plane of said parts,
   spot welding said overlapping metal parts and drying said paste in said gap,
   casting a molten metal solder over said overlapping portions and thereby filling said depression and permitting said solder to solidify.
2. The method of claim 1 wherein said paste is dried by means of a blow torch.
3. The method of claim 1 wherein said paste is extruded into the mating surface of said offset edge portions to form a strip of said paste thereon.

References Cited
UNITED STATES PATENTS

| 2,158,799 | 5/1939 | Larson | 29—471.1 |
| 2,452,805 | 11/1948 | Sussenbach | 29—484 XR |
| 2,506,728 | 5/1950 | McGrath | 29—471.1 |
| 2,510,727 | 6/1950 | Sussenbach | 29—471.1 |
| 2,932,886 | 4/1960 | Althouse | 29—471.5 |
| 3,150,445 | 9/1964 | Butt | 29—471.5 |
| 3,337,711 | 8/1967 | Garscia | 29—484 XR |

JOHN F. CAMPBELL, Primary Examiner

R. B. LAZARUS, Assistant Examiner

U.S. Cl. X.R.

29—499, 501

PO-1050
(5/69)

UNITED STATES PATENT OFFICE
CERTIFICATE OF CORRECTION

Patent No. 3,526,954           Dated September 8, 1970

Inventor(s) Seymour Katz and Richard M. Baehr

It is certified that error appears in the above-identified patent and that said Letters Patent are hereby corrected as shown below:

Column 1, line 62, "quality" should read -- quantity -- ;

Column 2, line 67, after "parts" insert -- prior --.

NOV. 17, 1970

(SEAL)
Attest:

Edward M. Fletcher, Jr.
Attesting Officer

WILLIAM E. SCHUYLER, JR.
Commissioner of Patents